(12) United States Patent
Fenger et al.

(10) Patent No.: US 6,751,659 B1
(45) Date of Patent: Jun. 15, 2004

(54) DISTRIBUTING POLICY INFORMATION IN A COMMUNICATION NETWORK

(75) Inventors: Russell J. Fenger, Beaverton, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,146

(22) Filed: Mar. 31, 2000

(51) Int. Cl.[7] ............................................. G06F 15/173
(52) U.S. Cl. ....................... 709/223; 709/224; 709/222; 709/221
(58) Field of Search ................................. 709/223, 224, 709/222, 221; 370/408; 717/171

(56) References Cited

U.S. PATENT DOCUMENTS

| | | | | | |
|---|---|---|---|---|---|
| 5,794,006 | A | * | 8/1998 | Sanderman | 709/223 |
| 5,870,561 | A | * | 2/1999 | Jarvis et al. | 709/238 |
| 6,170,009 | B1 | * | 1/2001 | Mandal et al. | 709/223 |
| 6,401,239 | B1 | * | 6/2002 | Miron | 707/203 |
| 6,463,470 | B1 | * | 10/2002 | Mohaban et al. | 709/223 |
| 6,487,594 | B1 | * | 11/2002 | Bahlmann | 709/225 |
| 6,499,117 | B1 | * | 12/2002 | Tanaka | 714/49 |
| 6,505,244 | B1 | * | 1/2003 | Natarajan et al. | 709/223 |

* cited by examiner

Primary Examiner—Zarni Maung
Assistant Examiner—Sahera Halim
(74) Attorney, Agent, or Firm—Fish & Richardson P.C.

(57) ABSTRACT

Selecting a subset of a hierarchical data structure based on a correspondence of the subset with a target in a communication network, and sending the subset of the hierarchical data structure to the target.

27 Claims, 7 Drawing Sheets

DISTRIBUTING POLICY INFORMATION IN A COMMUNICATION NETWORK

BACKGROUND

This invention relates to distributing policy information in a communication network.

Some networks operate merely as a passive "pipe" to transport data across the network. Other networks take advantage of advanced features of network devices, such as priority, custom, and weighted fair queuing. Adding such features complicates the configuration and management of the network.

To manage network components simply and intelligently, network designers have proposed policy based network management (PBNM). PBNM manages and controls a network as a whole, so that network operations conform to the business goals of the organization that operates the network and are applied on an individual, group, role, time of day, or other basis.

DETAILED DESCRIPTION

Figure 1:
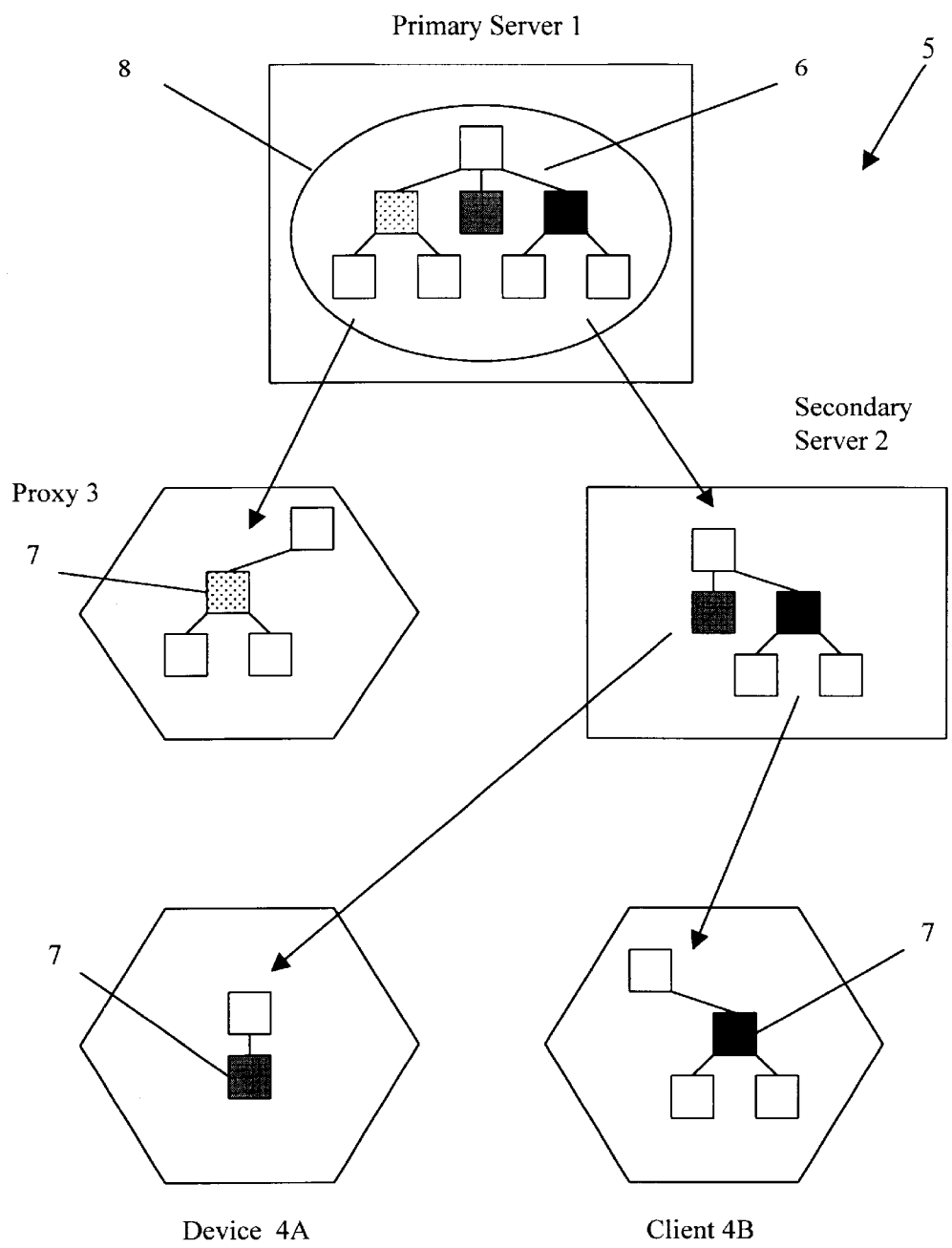
FIG. 1 shows schematically components of a network with replicated subsets of a policy tree.

The present invention relates to distributing selectively a set of policy information by policy servers to other network components in a timely and efficient manner. FIG. 1 illustrates distributions of subsets of policy information from policy servers, such as the primary server 1 and the secondary server 2, to other network components such as the proxy 3, the device 4A, and the client 4B within a network 5. A database 8 associated with the primary server 1 may contain voluminous number of policy rules that make up policy information for the whole network 5. Policy rules are conditions for a user/application system to access a resource. A resource may be, for example, bandwidth, multicasting, virtual local area networks, or security. Policy rules are often parsed into a rule such as IF (conditions) THEN (action1) ELSE IF (conditions) THEN (action2), etc. However, in enforcing the policy rules, not all of them need be distributed to each and every component in the network because the application of policy rules may be limited to a small number of network components. Therefore, for each component only a subset or subsets of the policy information relevant to that component can be distributed.

The primary server 1 maintains and manages a set of policy rules in a form of a policy tree 6, which is a representation of a hierarchical policy database structure and may show which node (e.g. the nodes 7) of the tree corresponds to which network component (e.g. the proxy 3, the device 4A, and the client 4B).

A node in the policy tree may be a parent node if there are sibling nodes under it in the hierarchy. Each sibling node is given an identifier that distinguishes it from the identifiers of other siblings. In other words, a combination of all the node identifiers of all the parent nodes and the identifier of the node on the path leading from the root of the tree to the node itself can be used as a unique identifier for the particular portion of policy information pertaining to the node. This concept is illustrated in FIG. 2.

Figure 2:
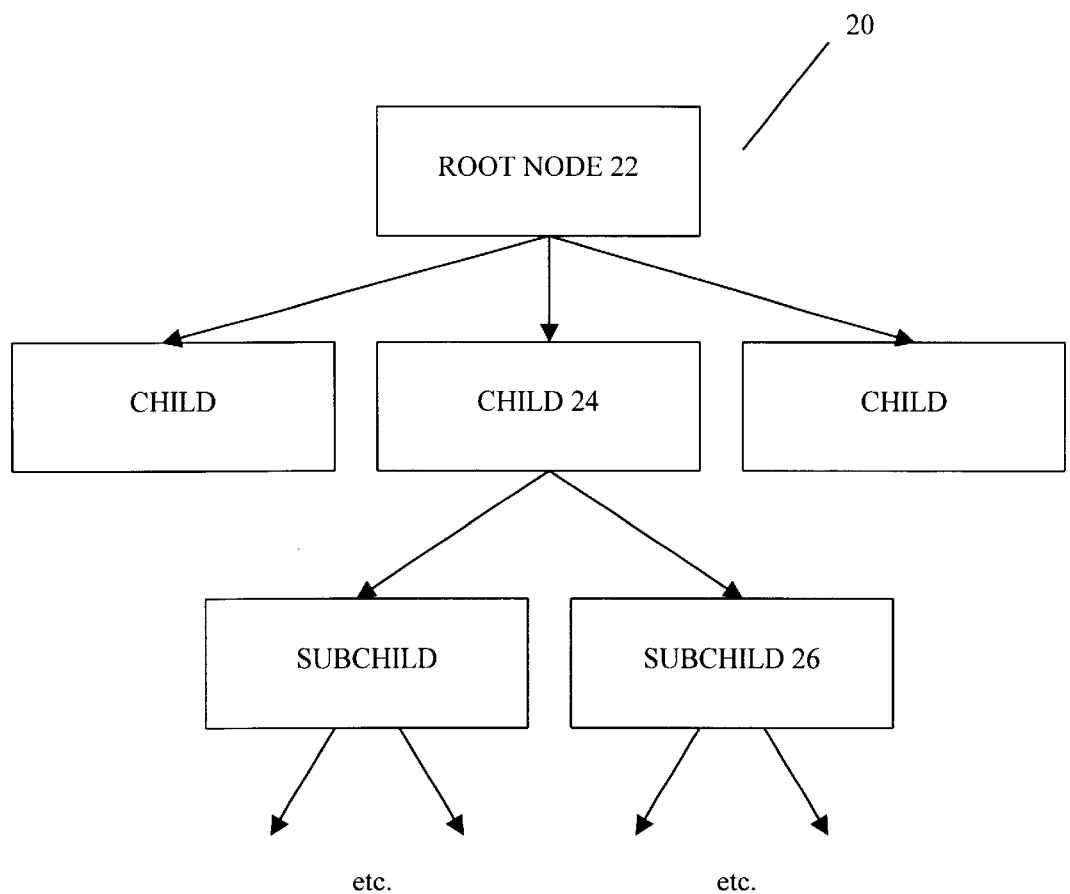
FIG. 2 is an exemplary hierarchical policy database.

In FIG. 2, each node in an exemplary tree 20 has a name, such as a Subchild 26, that is combined with its parents' names so that any node in the tree is uniquely identified. For example, the complete path for the SubChild 26 can be (Root Node 22, Child 24, SubChild 26), which represents a unique path name for SubChild 26 in the tree. A unique path name of a policy can be associated with a target, a general term used to describe a network component targeted to received a subset of policy information including the policy. This gives the target a relative position in the policy tree.

Returning to FIG. 1, relevant subsets of policy information are selected and relative positions of the targets are identified in the policy tree (the shaded nodes 7). The selected subsets are distributed, as described in greater detail below, to the targets, the proxy 3, device 4A and client 4B.

The primary server 1 can deliver policy updates to its targets. Policy updates may be required, for example, as a result of administrative changes to policy rules such as changes in access priority of a given user, changes in network conditions that affect policy rules such as changes in policy that depends on the traffic load, or transitory policy information related to time restriction of policy rules. The changes are made, as described below, in the database 8 connected to the primary server 1. The database 8 contains the superset of policy information (i.e. the policy tree 6). The updates can be distributed to all affected network components, including other policy servers such as the secondary server 2 that may further distribute the subsets of the policy information to other affected components. The affected components are those that possess, due to selection by the primary server 1, policy information that has been modified by human or programmed intervention.

Figure 3:
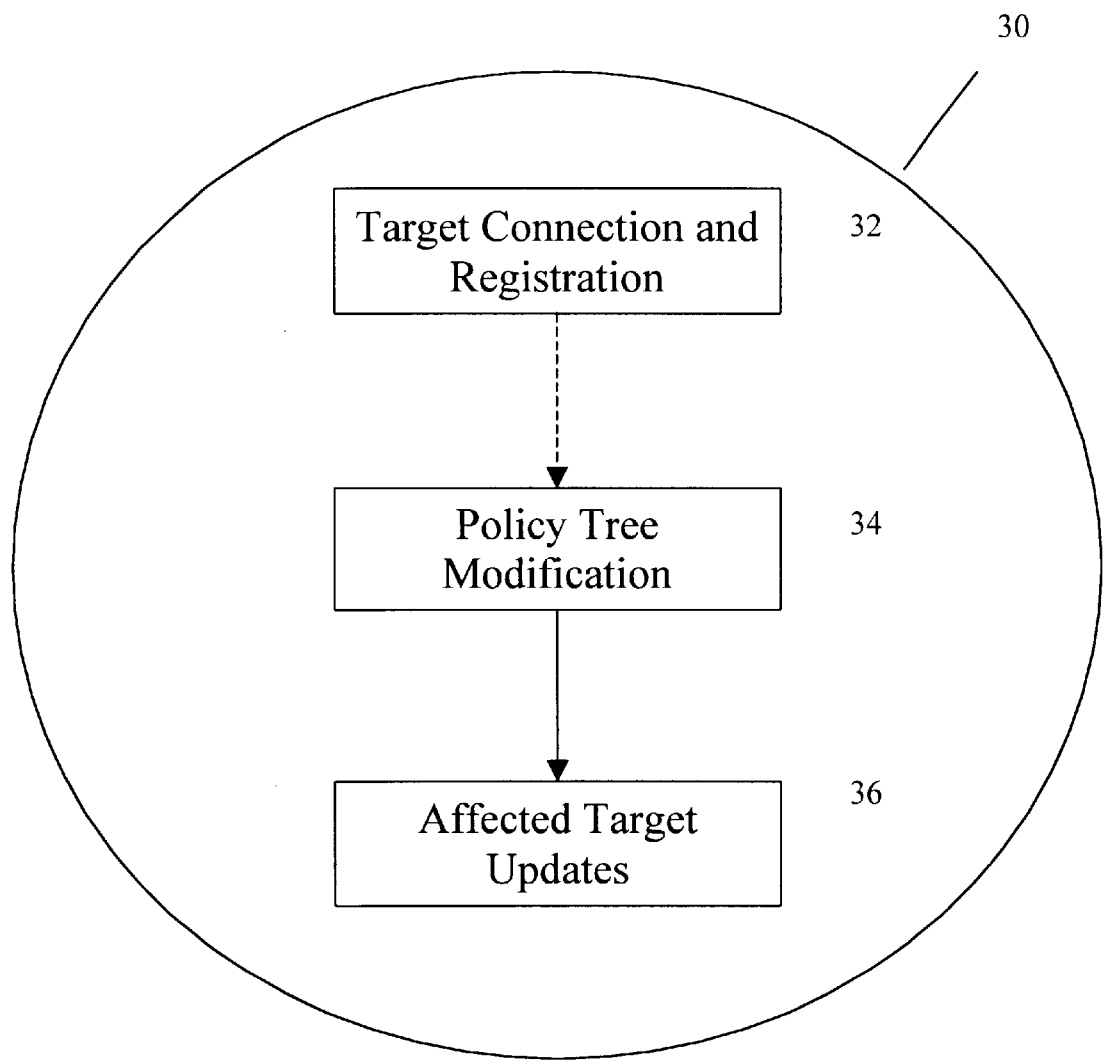
FIG. 3 illustrates a policy filtering and updating algorithm according to one embodiment of the invention.
Figure 4A:
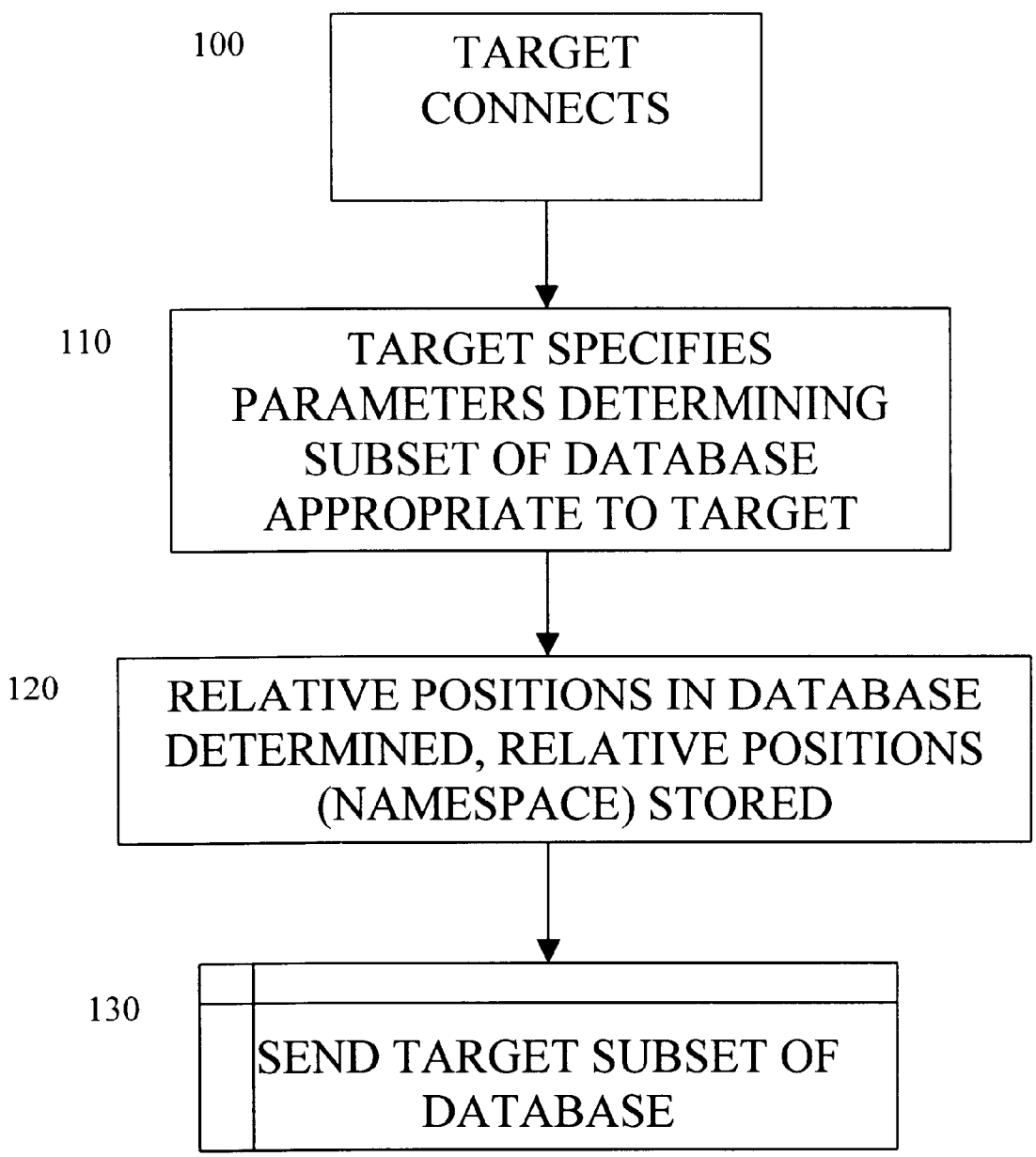
FIGS. 4A, 4B, and 4C are flowcharts showing details of the policy filtering and updating algorithm according to one embodiment of the invention.
Figure 4B:
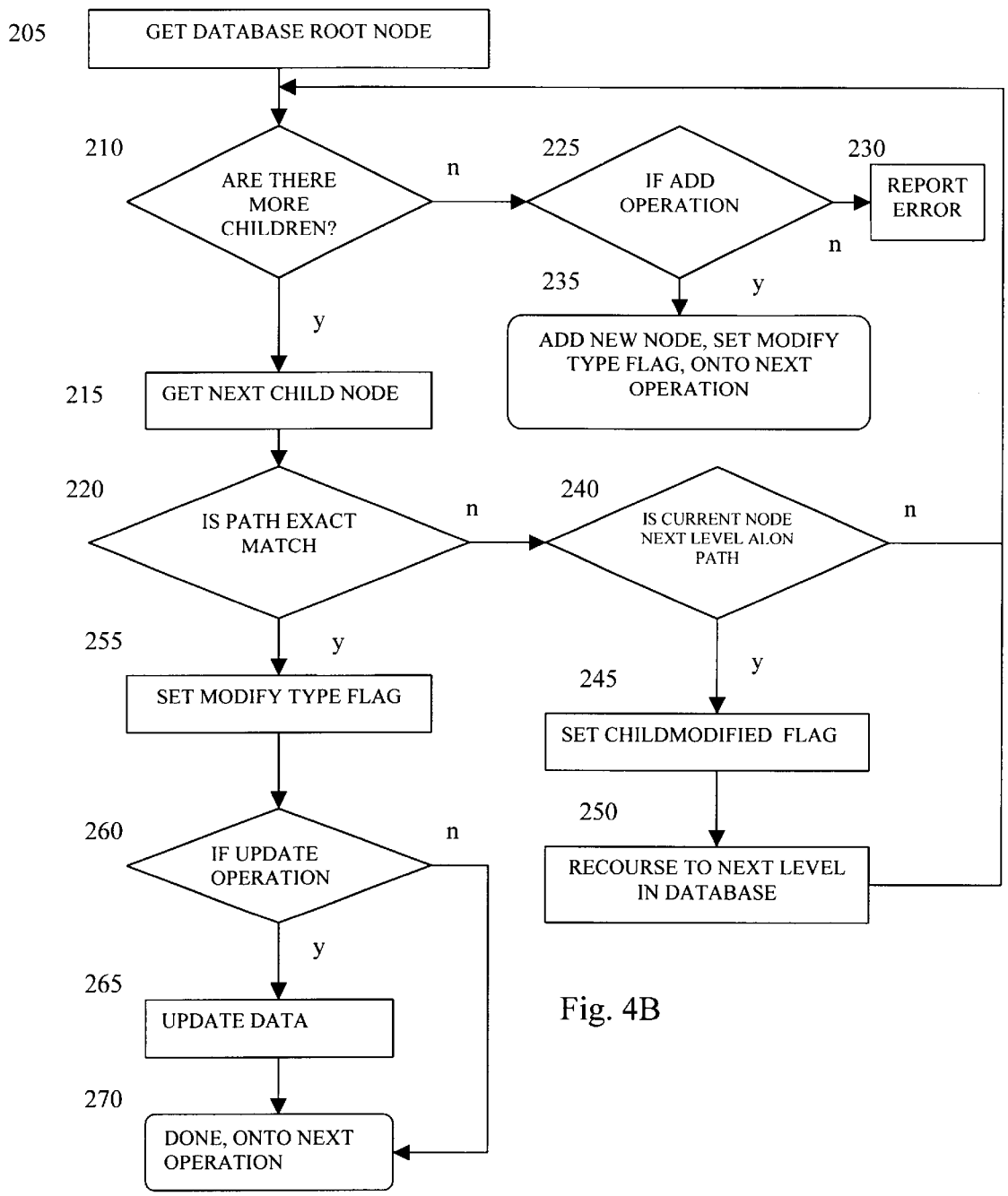
Figure 4C:
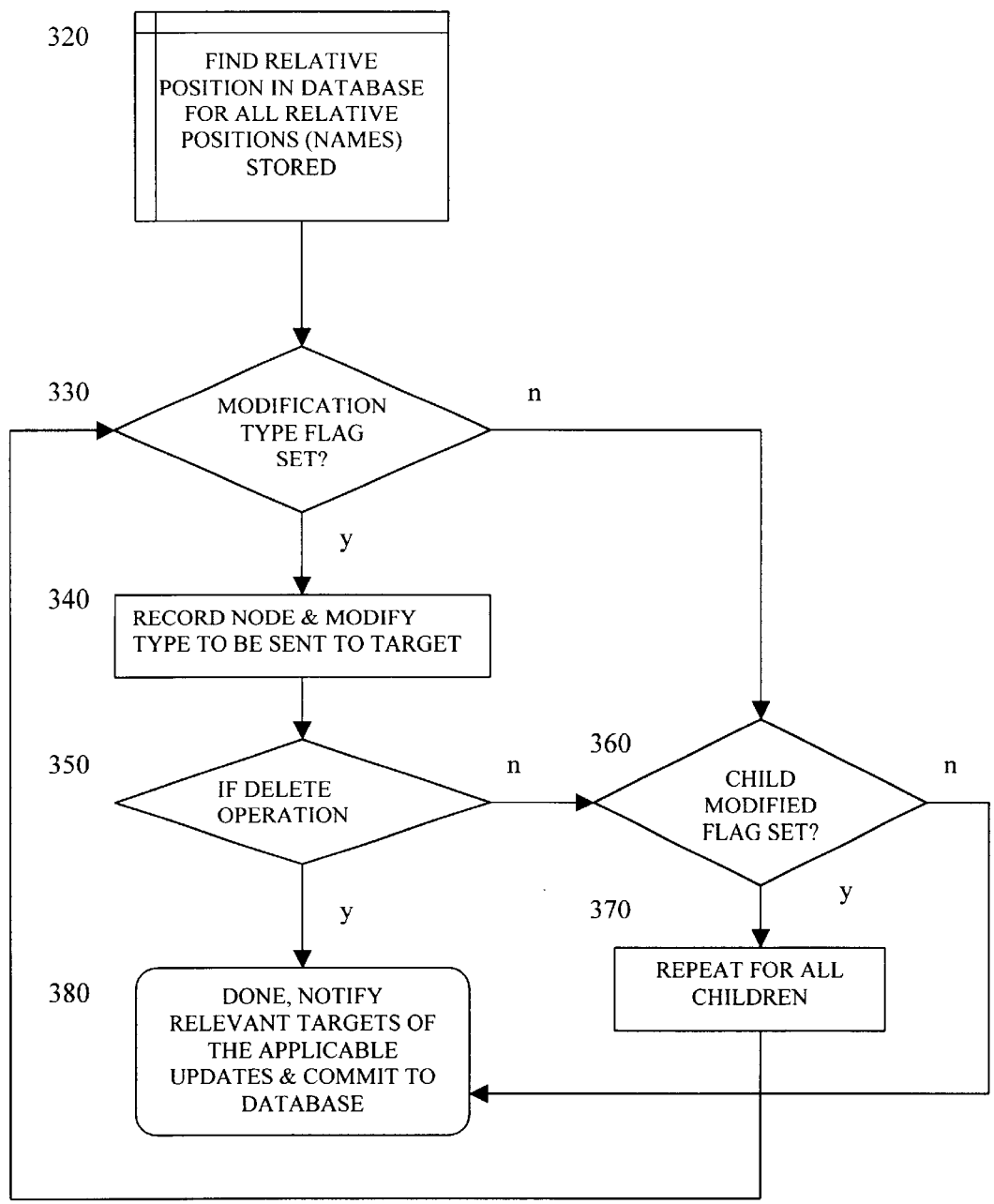

The primary server 1 is configured to execute a selective distribution and update algorithm 30, as shown in FIG. 3. This includes three processes: (1) connection and registration 32 of a component as a target involving selection and distribution of subsets of policy information; (2) tree modification 34 involving flagging nodes of a policy tree in a policy server for modification; and (3) affected target updates 36 involving finding the flagged nodes for modification and modifying them. The connection and registration 32 may occur serially, in parallel, or separately with the tree modification 34 and the affected target updates 36. FIGS. 4A, 4B, and 4C illustrate further details of these three processes, respectively. The following discussion assumes that there is a parent policy server that contains a superset of the policy database (policy information stored in a database) contained by all its possible targets.

The policy selection process in the connection and registration 32 is based on an evaluation of the policy tree appropriate for a specific target. As shown in FIG. 4A, during target initialization, a target, such as the device 4A, connects to the policy server 1 via the secondary server 2 and makes a request for policy information pertaining to it (block 100). The target identifies itself, describes its capabilities and roles in the network, such as giving user ID or requesting certain resources, and describes how it is configured to work within the network. The policy server 1 uses the information about the target as a filter to select the relevant subset of policy information (block 110) for delivery to the target.

In general, policy filtering selects policies by their association with specific targets, which may be network devices, their interfaces, or any grouping of devices and interfaces. Polices not associated with those specific targets are filtered out. Preferably, only those policies actually associated with the specific targets are downloaded to the targets.

The policy server 1 may filter policies by selecting only subsets of policies applicable to a particular target at a particular time. As new polices become applicable at a certain time later, they are downloaded to the appropriate targets in a timely manner.

Filtering also can be based on other information such as network conditions, device connectivity, and device capabilities. For example, the policy server 1 can limit the types of policies downloaded to a target based on the state of the network. For a heavily loaded network, one set of policies may be downloaded to a target while another set may be downloaded for a lightly loaded network. Either a set for heavily loaded network or a different set for lightly loaded network may be downloaded to a particular target. Also, depending on the layout of the network and the location of a given target in the network, only a subset of policy information may apply to the target. For example, if traffic is identified as requiring high QoS (Quality of Service), a policy required for that purpose may be downloaded only to those targets that are in the data path of the given traffic. In another instance, capabilities of a network target may dictate what the appropriate policies are. Policies that require a set of capabilities the target does not have need not be downloaded to the device.

Policy filtering also can be based on other devices that the target may be serving as a proxy for policy information. For example, information on the children of the target also may be used as filters for policy selection. That is, if the relevant policy information has children elements for which the target is a proxy, these elements may also be considered applicable for policy filtering. Table 1 shows an example of policies applicable to targets in terms of time, user and destination IP, among others.

TABLE 1

| Policy | Target | Time | User | Destination IP | ... |
|---|---|---|---|---|---|
| P1-high priority | Device x | 8 AM–5 PM | Russ | 134.134.12.12 | * |
| P2-low priority | Device y | 8 AM–5 PM | Dave | 134.134.12.13 | * |
| P3-high priority | Device z | 8 AM–5 PM | * | 134.134.12.14 | * |
| P4-high priority | Device x, Device y | 1 PM–5 PM | Andy | * | * |
| P5-low priority | * | * | Scott | * | * |

The policies targeted to Device x at 8 AM include P1 (8 AM to 5 PM) and P5 (no time and device restriction). Since P2, P3, and P4 are not applicable to Device x at 8 AM, these policies are filtered out of the selection when providing the relevant policies to Device x. When the time changes to 1 PM, P4 is added to the policies applicable to Device x and is sent to the device or proxy. At 5 PM, all the policies except P5 are filtered out. In this simplified example, policy filtering is used to determine which policies are applicable to a particular target based on the target and time constraints.

As policy is found to be relevant for the particular target based on target information, relative subsets of a policy tree are recorded in the policy server's database 8 as applicable to that target (block 120). These relative subsets are recorded using the name of the applicable policy data node as described with respect to FIG. 2. The target associated with the policy (hence the node) is recorded either in the policy tree directly or in a separate structure that keeps track of all connected targets (i.e. a target information list containing names of the targets corresponding to the names of the respective relevant nodes in the policy tree).

Once the appropriate subset of the policy database (i.e. the policy tree) is selected for the target and the relative position of the target in the policy tree is identified and stored (block 120), the relevant subset of the policy database is downloaded to the target (block 130). The connection & registration process can be repeated for every target that requires policy selection.

As the policy database is modified, the server 1 is responsible for notifying the targets affected by the change. To do this, the server 1 determines which portions of the policy tree have changed, which can be performed as the policy database is being modified.

A modified policy element identified by a path name can be found in the policy tree by performing a top down search of the tree, from the root of the tree to the node with the affected policy element. As the named path is traversed toward the affected policy element, the nodes are flagged as having a modified child. That can be done by setting childModified flags to "true" along the named path of the affected policy element (blocks 205 to 250). First the root node of the policy tree is located (block 205). If there are more children along the path (block 210), the next child node is obtained (block 215). If there are no more children along the named path and the operation is to add a node (block 225), then a node is added to the policy tree and a modification type flag for the addition is set (block 235). If there are no more children to be searched and the operation is not to add a node, then an error message is given (block 230). If the operation is other than to add, the search continues along the named path by going further down the path (block 240) and a childModified flag is set (block 245). Flagging nodes as childModified flags is continued (block 250) until an exact match to the named path is reached (block 220).

When the named policy node is finally found, a modification type flag is set to specify the type of operation performed on the node: update or delete the named policy node in the policy tree (block 255). If the operation is to update (block 260), the named policy is node is updated (block 265). If the operation is to delete, it and all its child nodes are simply flagged for deletion (block 270).

FIG. 4C illustrates a process for updating affected targets. A target information list that can be stored in a database is queried by the primary server 1 to determine which subsets of the policy tree are associated with particular targets; in other words, the targets' relative positions in the policy tree are checked. For example, a target containing a replicated portion (i.e. distributed copy) of the policy tree that was modified in the database 8 is identified by examining the names stored for its selected parent node in the target information list in the database (block 320), and checking to see whether or not the node has any of the modification flags set (block 330). If the childModified flag is set, then the parent node has one or more children that were modified. Such children nodes are found by following the specified path in the policy tree via the childModified flags (blocks 360 and 370). If any branch contains a child with its updated/added/deleted flag set (i.e., the modification type flag), information such as the name of the path, the modification type, and new data (when adding or updating), are collected and recorded (block 340) and this group of information is sent to the corresponding target (block 380). In general, if the relative position is modified as indicated by the modification type flag and/or has its childModified flag set to true, the target is notified of the change on its subset of the policy tree (block 380). The process is repeated for all targets in the target information list.

At this stage, all targets that have replicated the affected portion of the database are updated, and the modifications to the database are stored. Finally, the modification flags are reset, and if nodes are marked for deletion (block 350), they are deleted (block 380). New updates to the policy database subsequently may be performed.

Figure 5:
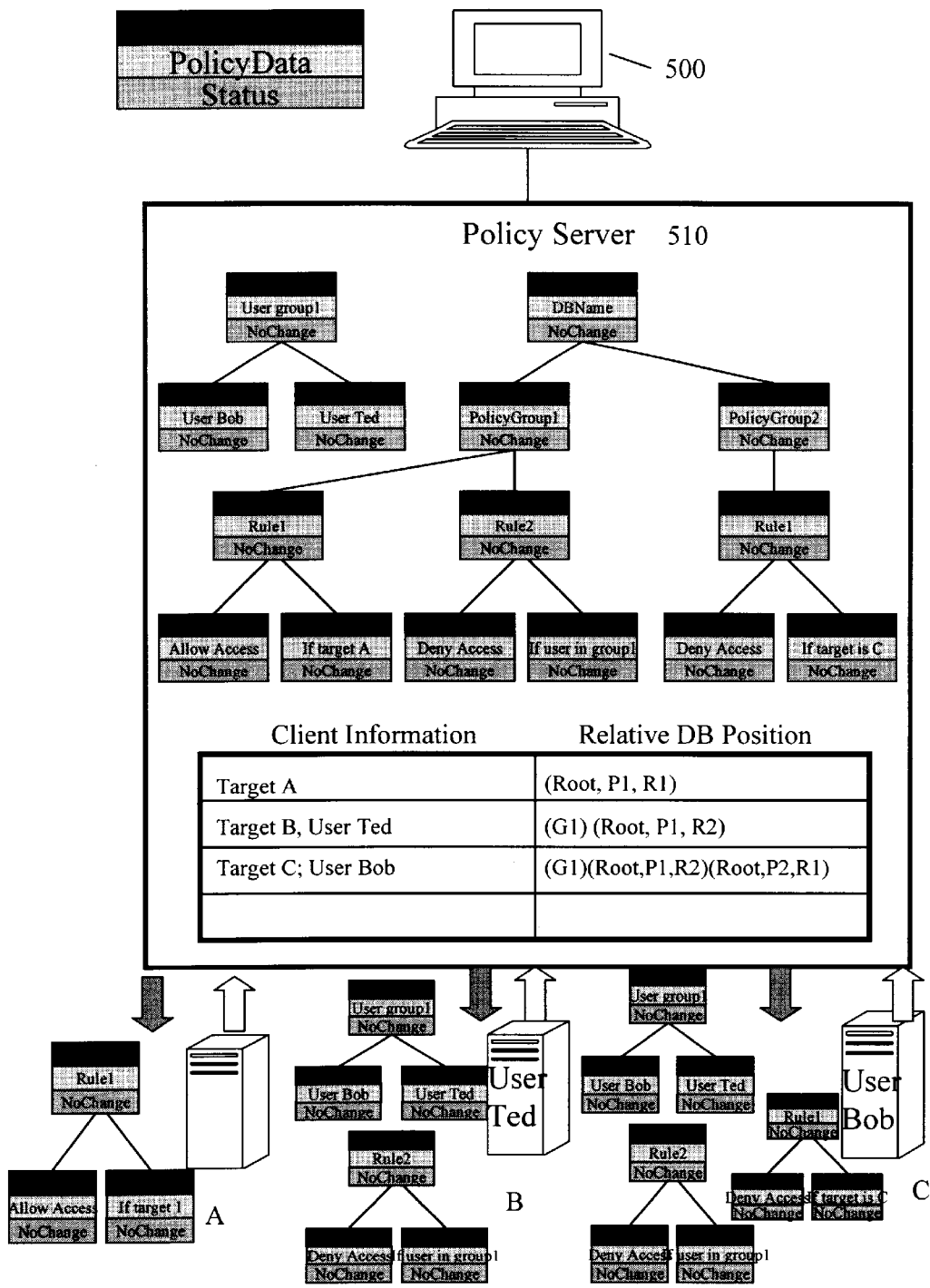
FIG. 5 shows a simplified example of how a policy is distributed and updated according to one embodiment of the invention.

FIG. 5 shows computer station 500 connected to policy server 510 containing exemplary policy trees and the relative database positions (target information list) of network targets, A, B, and C. Operations of the system include the connect and register, tree modification, and affected target update processes described above. First, a particular target's interest in specific subsets of the policy tree is registered. Targets A, B, and C are coupled to the policy server 510 to provide information about themselves. In this example, the relative position of each target in the policy tree is defined to be the node above the node corresponding to each target. Therefore, for target A, the relative position is at R1; for user Ted, target B, the relative positions are at G1 and R2; and for user Bob, target C, the relative positions are at G1, R2, and R1. An appropriate subset of the tree is downloaded to each target, and the relative positions of the targets are recorded. The relative database position for target A is uniquely identified by the name, (Root, P1, R1); for user Ted, (G1) and (Root, P1, R2); and for user Bob, (G1), (Root, P1, R2), and (Root, P2, R1).

When a change is made to the database, the policy tree Modification process is used to locate the affected node by the path name associated with the node. For example, suppose a change is made to the database to delete (Root, P2, R1) from the computer station 500 connected to the policy server 510. The server 510 performs a top down search of the policy tree, taking the paths from the root to the node name of the modified node. As the correct path is traced down the policy tree, all the parent nodes of the modified node have their childModified flag set to "true." Therefore, in this example, the childModified flag is set to "true" for Root and P2. Nodes of other paths taken, for instance from Root to P1, do not have the childModified flag set because these paths do not match the unique modified node name. Instead of going further down to the next path, another child, in this case P2, is queried for comparison with the node name. When the affected node, R1, is found by going to the next level, its modification type is set to "delete." Also, children under that node, in other words A1 and C1, are also set to "delete."

As previously discussed, the affected target update process is used to find the relevant target and to update and notify the target of the modification. The relative positions of the target that was recorded as being interested in some subset of the policy tree are checked. The search for the childModified flag continues until the modification type flag is found. In the example of FIG. 5, the relative database position of user Bob, (Root, P2, R1), matches the modification type flag set in the policy tree. The position is found by following the path where the childModified flag is set to "true." When the modified node is found, it is conveyed to the affected target, including the name of the modified node and the operation performed (i.e. delete). If the policy was added or updated, the node's data also is sent similarly.

Once all affected targets have been notified of the change to the policy tree, all the flags are reset. The nodes marked to delete including the children are removed form the policy tree and resources are cleaned-up. Hence, R1, A1, and C1 are deleted from the policy tree and from user Bob.

The foregoing technique can help make policy control of networks fast because only the minimum pertinent amount of updated policy information is provided via individual transactions. It is easily scalable because only the relevant subset of the policy database is propagated tithe applicable targets. Finally, it is efficient because policy is delivered to the appropriate destinations rather than the destinations having to search for their policies. Therefore, continuous polling by each target of a central policy repository can be avoided. The system can keep track of what subsets of a policy database have been downloaded to targets.

Furthermore, the foregoing techniques may be used to address notification in database services in general. Conventional database transaction systems and message passing services provide transactions of packets of data. However, databases in these systems do not engage in persistent communication between targets and servers for the propagation of appropriate subsets of database updates to all affected parties within the network. The system for filtering database information for distribution to remote targets can be implemented for a general system. In a persistent communication system, targets would be notified of the most recent updates or changes in the database relevant to them as soon as the updates or changes are made in the database.

The foregoing techniques can be implemented using a computer program executable on a programmable computer. The computer program can be stored on a storage medium, such as random access memory (RAM), readable by a general or special purpose computer, to cause the computer to execute the functions described above.

Other implementations are within the scope of the following claims.

What is claimed is:

1. A method comprising:
    identifying a target in a communication network, said communication network is represented by a policy tree, said target uniquely identified as a target node in the policy tree;
    selecting based on the identification of the target node, a subset of policy information from a superset of policy information, relevant to the target node from the policy tree having a hierarchical data structure; and
    sending only the selected subset of policy information to the target for implementing the selected policy information at the target.

2. A method of claim 1, further comprising:
    identifying a first subset to be modified from the superset of policy information;
    determining a target node having a second subset corresponding to the first subset; and
    modifying the second subset in the target node based on the modification of the first subset.

3. A method of distributing policy information within a communication network, the method comprising:
    identifying a target in a communication network, said communication network is represented by a policy tree, said target uniquely identified as a target node in the policy tree;

selecting a subset of policy information, from a superset of policy information, from the policy tree of the communication network relevant to the target node; and downloading the subset of the policy tree to the target for implementing the selected policy information at the target.

4. The method of claim 3, in which the selecting is based on information concerning the target.

5. The method of claim 3, further comprising determining a relative position of the subset of the policy tree within the policy tree after selecting the subset of the policy tree relevant to the target.

6. A method of distributing policy information in a communication network, the method comprising:

matching a first subset of policy information to be modified to policy information relevant to a node of a policy tree, the first subset being a subset of the policy tree having a hierarchical data structure, said first subset of policy information being obtained from a superset of policy information;

identifying a target corresponding to the node and containing a second subset of the policy tree, said second subset corresponding to the first subset that is unmodified; and notifying the node containing the second subset about the first subset to be modified.

7. The method of claim 6, further comprising modifying the first subset within the superset of policy information and the second subset at the node.

8. The method of claim 7, wherein matching the first subset includes searching from a top of the policy tree to the node and flagging other nodes along a path to the node.

9. The method of claim 8, including setting a flag associated with the second subset of the node that matches the first subset wherein the flag denotes the type of modification.

10. The method of claim 9, wherein identifying the target includes matching the first subset to the node flagged with the type of modification in the policy tree.

11. The method of claim 10, further comprising modifying the second subset at the node in accordance with the type of modification denoted for the node.

12. The method of claim 9, wherein the nodes flagged with the type of modification are at least one of updated, added, or deleted.

13. The method of claim 12, wherein if the type of modification is set to delete, then nodes on a lower level of the tree and associated with the node that is flagged with the type of modification are set to delete.

14. The method of claim 12, wherein if the modification type flag is set to update, old policy information is replaced with new policy data.

15. The method of claim 12, wherein if the modification type flag is set to add, a new node is created.

16. A communication network system comprising a policy server configured to:

identify a target in a communication network, said communication network is represented by a policy tree, said target uniquely identified as a node in the policy tree;

select a subset of policy information from the policy tree of the communication network relevant to the target, said first subset of policy information being obtained from a superset of policy information; and download to the target only the subset of the policy information to implement the subset at the target.

17. The system of claim 16, in which the policy server is further configured to:

receive information concerning the target before selecting the subset, wherein the information is used to select the subset relevant to the target.

18. The system of claim 17, in which the policy server is further configured to:

determine a relative position of the subset of the policy tree within the policy tree after selecting the subset of the policy tree relevant to the target.

19. A communication network system comprising a policy server configured to:

match a first subset of policy information to be modified to policy information relevant to a node of a policy tree, said first subset being a subset of the policy tree having a hierarchical data structure, said first subset of policy information being obtained from a superset of policy information;

identify a target corresponding to the node and containing a second subset of the policy tree, said second subset corresponding to the first subset that is unmodified; and notify the target containing the second subset about the first subset to be modified.

20. The system of claim 19, in which the policy server is further configured to:

modify the first subset of the policy free within the policy tree and the second subset of the target.

21. A communication network system comprising:

a parent server containing a superset of a policy database having a hierarchical data structure;

secondary servers each containing a respective subset of the policy database; and targets each containing a respective portion of the subset of the policy database, wherein the subsets of the policy database are replicated to the secondary servers and the portions of the subsets are replicated to the targets based on information describing the targets.

22. The communication network system of claim 21, wherein the parent servers maintain status information of the replicated subsets and portions of the subsets, and the targets are updated on the portions of the subsets whenever changes are made to the portions of the subsets in the policy database.

23. The communication network system of claim 22, wherein the targets containing a subset of policy database affected by changes in the policy database are notified of the changes and are updated on the affected subset of the policy database.

24. An article comprising a computer-readable medium that stores computer-executable instructions for causing a computer system to:

identify a target in a communication network that is represented by a policy tree, said target uniquely identified as a node in the policy tree;

select a subset of policy information from the policy tree of the network relevant to the target, said subset of policy information being obtained from a superset of policy information; and download to the target only the subset of the policy information to implement the subset at the target.

25. The article of claim 24, further causing the computer system to:

receive information concerning the target before selecting the first subset, wherein the information is used to select the first subset relevant to the target.

26. An article comprising a computer-readable medium that stores computer-executable instructions for causing a computer system to:

match a first subset of policy information to policy information relevant to a node of a policy tree, said first subset being a subset of the policy tree having a hierarchical data structure, said first subset of policy information being obtained from a superset of policy information;

identify a target corresponding to the node and containing a second subset of the policy tree, said second subset corresponding to the first subset that is unmodified; and notify the target containing the second subset about the first subset to be modified.

27. The Article of claim 26, further causing the computer system to:

modify the first subset of the policy tree within the policy tree and the second subset of the target.

\* \* \* \* \*